United States Patent
Chen

(10) Patent No.: US 7,166,820 B1
(45) Date of Patent: Jan. 23, 2007

(54) ROTATING-TYPE OVEN

(75) Inventor: Nai-En Chen, Dong Guan (CN)

(73) Assignee: Henco & Top Industries Inc., Taipei (TW)

( * ) Notice: Subject to any disclaimer, the term of this patent is extended or adjusted under 35 U.S.C. 154(b) by 0 days.

(21) Appl. No.: 11/291,958

(22) Filed: Dec. 2, 2005

(51) Int. Cl.
H05B 3/42 (2006.01)
A47J 37/04 (2006.01)

(52) U.S. Cl. .................. 219/386; 219/470; 99/441
(58) Field of Classification Search .............. None
See application file for complete search history.

(56) References Cited

U.S. PATENT DOCUMENTS

| 2,185,979 | A | * | 1/1940 | Dumas | 99/441 |
| 2,697,395 | A | * | 12/1954 | Steriss | 99/423 |
| 3,472,156 | A | * | 10/1969 | Bardeau | 99/423 |
| 5,062,355 | A | * | 11/1991 | Greiwe | 99/423 |
| 6,349,634 | B1 | * | 2/2002 | Delpierre et al. | 99/441 |
| 6,393,971 | B1 | * | 5/2002 | Hunot et al. | 99/341 |
| 6,659,574 | B1 | * | 12/2003 | Huegerich | 312/137 |
| 6,782,802 | B1 | * | 8/2004 | Hunot et al. | 99/341 |
| 2005/0051037 | A1 | * | 3/2005 | Gaskill et al. | 99/421 R |

FOREIGN PATENT DOCUMENTS

CN 3274550.8 10/2004

* cited by examiner

Primary Examiner—Joseph Pelham
(74) Attorney, Agent, or Firm—Rosenberg, Klein & Lee

(57) ABSTRACT

The rotating-type oven includes a driving device, electrothermal pipes, rollers, holders and a box. The electrothermal pipe is installed in the roller, and the electrothermal pipe is connected with the roller via a porcelain base and a plug. The porcelain base is fastened on the holder. The rotating-type oven of the present invention has the characteristics of being able to bake food rapidly, having a stable operation, and being easy to disassemble for cleaning.

5 Claims, 1 Drawing Sheet

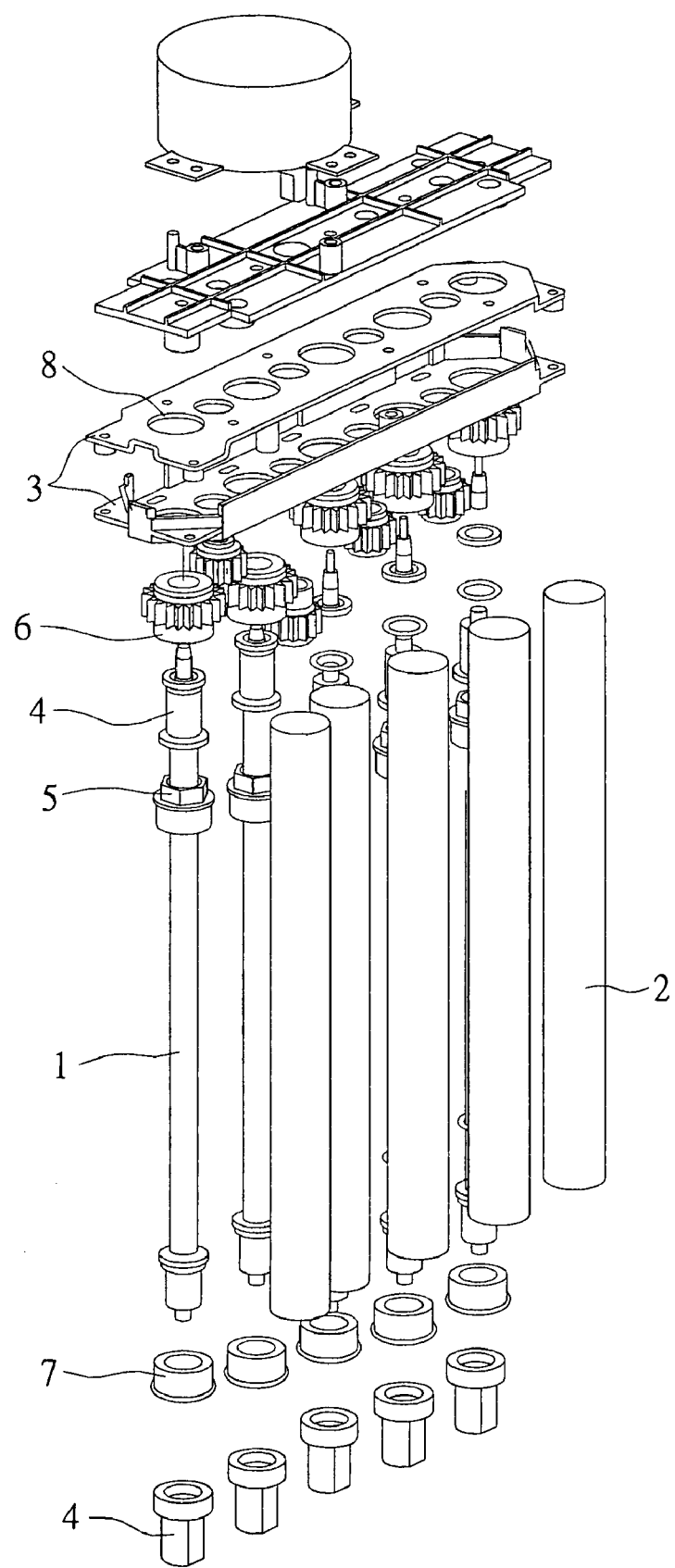

ROTATING-TYPE OVEN

BACKGROUND OF THE INVENTION

1. Field of the Invention

The present invention relates to an oven. In particular, this invention relates to a rotating-type oven.

2. Description of the Related Art

Baking is a popular method for cooking food. Conventionally, people use wood coal to bake sweet corn, sausages or ham. It is quick to bake food by wood coal. However, it has the problem of being quite unhygienic so there has been a subsequent withdraw from the marketplace. As the standard of living has been raised, a variety of ovens have appeared in modern houses. However, in a conventional oven food is placed upon an oven tray. This method has the problem of unbalanced heating, so the food is often scorched or part of the food is not cooked properly. CN patent 03274550.8 disclosed a multi-function hotdog machine. A roller is installed above the heating element. A motor is used for driving the roller to rotate the baked food. It can heat the food uniformly and it is hygienic. However, it has various problems—it takes a long time to bake food and it has a low heating efficiency. Moreover, the roller is directly held on the concave arc of the holder. Therefore, the rotation of the roller is unstable. A rotating-type oven having different characteristics, such as being able to bake food rapidly, having a stable operation, and being easy to disassemble for cleaning, is therefore proposed.

SUMMARY OF THE INVENTION

One particular aspect of the present invention is to provide a rotating-type oven having the characteristics of such as being able to bake food rapidly, having a stable operation, and being easy to disassemble for cleaning.

The rotating-type oven includes a driving device, electrothermal pipes, rollers, holders and a box. The electrothermal pipe is installed in the roller, and the electrothermal pipe is connected with the roller via a porcelain base and a plug. The porcelain base is fastened on the holder.

One end of the porcelain base is a hollow column body, and the other end of the porcelain base is a hollow rectangular body.

One end of the roller is a driving end. The plug is an external hexagonal plug. The external hexagonal plug is fitted and connected to an internal hexagonal gear.

The holder includes a porcelain base positioning hole, and one end of the positioning hole includes a spring.

The set of electrothermal pipes are belonging to a separated-type and the electrothermal pipes are installed on the positioning hole of the holder in parallel.

The present invention installs the electrothermal pipe in the roller. Because the present invention directly transmits the heat to the food via the stainless roller, it can shorten the time needed for the heating process. It bakes the food more rapidly, reduces power use and is cheaper then the prior art.

There is a positioning hole on the holder, the positioning hole has a spring, and the electrothermal pipe is fastened in the positioning hole via the porcelain base, the spring force makes the roller stable so that it cannot move to one side. Therefore, the roller operates smoothly. Furthermore, the assembly and disassembly of the rotating oven is simple. Via the loose fitting of plug, the external hexagonal plug and the porcelain base, the fitting of the external hexagonal plug and the internal hexagonal gear, the electrothermal pipe is not rotated when the internal hexagonal gear is rotated to make the roller rotate. Therefore, the usage life of the electrothermal pipe is lengthened.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows:

The FIGURE is a schematic diagram of the structure of the embodiment of the present invention.

DETAILED DESCRIPTION OF THE PREFERRED EMBODIMENTS

Please refer to the FIGURE, which shows a schematic diagram of a rotating-type oven of the present invention. The rotating-type oven includes a driving device, electrothermal pipes 1, rollers 2, holders 3 and a baking box. The electrothermal pipe 1 is installed in the roller 2, and the electrothermal pipe 1 is connected with the roller 2 via a porcelain base 4 and a plug 7.

The fit between the plug 7 and the porcelain base 4 is tight and the fit between the porcelain base 4 and the electrothermal pipe 1 is loose. One end of the porcelain base 4 is a hollow column body and another end of the porcelain base 4 is a hollow rectangular body. When assembled, the porcelain base 4 is installed on the electrothermal pipe 1. The hollow column body end of the porcelain base 4 faces inward. Then, an external hexagonal plug 5 and the plug 7 are installed to position the electrothermal pipe 1. The electrothermal pipe 1 is fastened in the positioning hole 8 of the two ends of the holder 3 via the porcelain base 4. The spring force makes the electrothermal pipe 1 fasten firmly so that it cannot move to one side. Therefore, the roller 2 is operated smoothly. When the roller 2 needs to be disassembled for clearing, the roller 2 is pushed forward to the spring so that it can be removed easily. As such, it is very convenient. Via the loose fit of the plug 7, the external hexagonal plug 5 and the porcelain base 4, the fit of the external hexagonal plug 5 and the internal hexagonal gear, the electrothermal pipe 1 is not rotated when the internal hexagonal gear is rotated to make the roller 2 rotate together. Therefore, the usage life of the electrothermal pipe is lengthened.

The present invention adopts the porcelain base 4 to connect with the electrothermal pipe 1. The porcelain base 4 is a good heat insulating material due to its low heat-insulating coefficient. The present invention adopts a low power rate motor to drive a deceleration gear set for reducing the speed. The deceleration gear set is connected with the transmission gear.

A plurality of transmission gears are located below the positioning hole 8 of the holder 3 in parallel and match each other to form a transmission gear set. Each of the transmission gears corresponds to the roller 2 and the internal hexagonal gear drives the roller 2 to rotate. The present invention provides a rotating-type oven having the characteristics of being able to bake food rapidly, having a stable operation, and being easy to disassemble for cleaning.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A rotating-type oven, comprising:
a driving device, electrothermal pipes, rollers, holders and a box; wherein the electrothermal pipe is installed in the roller, the electrothermal pipe is connected with the roller via a porcelain base and a plug, and the porcelain base is fastened on the holder.

2. The rotating-type oven as claimed in claim 1, wherein one end of the porcelain base is a hollow column body and another end of the porcelain base is a hollow rectangular body.

3. The rotating-type oven as claimed in claim 1, wherein one end of the roller is a driving end, the plug is an external hexagonal plug, and the external hexagonal plug is fitted and connected to an internal hexagonal gear.

4. The rotating-type oven as claimed in claim 1, wherein the holder comprises a porcelain base-positioning hole, and one end of the positioning hole has a spring.

5. The rotating-type oven as claimed in claim 1, wherein the set of electrothermal pipes are belonging to a separated-type and the electrothermal pipes are installed on the positioning hole of the holder in parallel.

* * * * *